United States Patent [19]

Hall

[11] Patent Number: 5,327,433

[45] Date of Patent: Jul. 5, 1994

[54] DIGITAL TANDEM CHANNEL UNIT INTERFACE FOR TELECOMMUNICATIONS NETWORK

[75] Inventor: Clifford L. Hall, Huntsville, Ala.

[73] Assignee: Adtran Corporation, Huntsville, Ala.

[21] Appl. No.: 752,777

[22] Filed: Aug. 30, 1991

[51] Int. Cl.$^5$ ................................................ H04J 3/06
[52] U.S. Cl. ........................... 370/100.1; 370/105.1; 370/105.4; 379/224
[58] Field of Search ............... 370/100.1, 105.1, 105.4; 375/112; 379/224

[56] References Cited

U.S. PATENT DOCUMENTS

| | | | |
|---|---|---|---|
| 4,125,745 | 11/1978 | Sterdl | 370/105.1 |
| 4,833,675 | 5/1989 | Hekimian et al. | 370/105.1 |
| 5,014,272 | 5/1991 | Yoshida | 370/100.1 X |
| 5,144,620 | 9/1992 | Ishizaki et al. | 370/105.1 X |

Primary Examiner—Douglas W. Olms
Assistant Examiner—Russell W. Blum
Attorney, Agent, or Firm—Charles E. Wands

[57] ABSTRACT

A digital tandem channel unit installable in an intermediate central office of a digital carrier telephone network maintains the digital format of the T1 traffic in the course of a DS0 tandem cross-connect, so as to eliminates the possibility of corruption of voice/data traffic, as may occur in a conventional 'analog' office cross-connect tandem pair due to quantization errors introduced into the data stream in the course of the digital to analog conversion of the data. Also, the invention incorporates control software in each tandem channel unit's micro-controller that allows it to respond to analog tone signalling test procedures initiated from either two or four-wire channel ports of network access equipment.

19 Claims, 9 Drawing Sheets

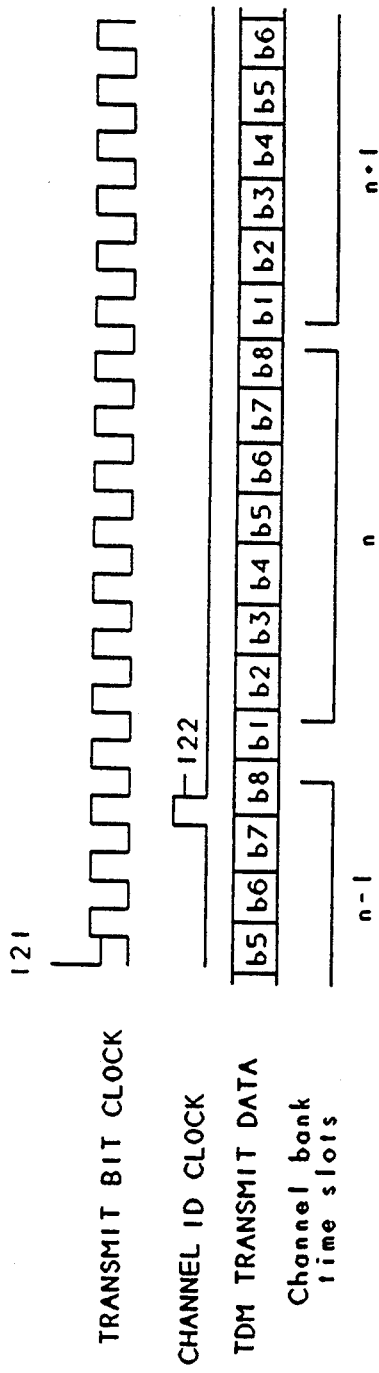

| TABLE A: TONE SEQUENCE TO TRANSMIT DEPENDENT ON CIRCUIT POSITION | | | | | | | |
|---|---|---|---|---|---|---|---|
| DTDM LOCATION FROM TEST ACCESS | 1ST | 2ND | 3RD | 4TH | 5TH | 6TH | NTH |
| TONES IN HERTZ 5 SECONDS MINIMUM | 634 484 564 | 634 484 434 484 564 | 634 484 434 484 434 484 564 | 634 484 434 484 434 484 434 484 564 | 634 484 434 484 434 484 434 484 434 484 564 | 634 484 434 484 434 484 434 484 434 484 434 484 564 | 634 484 434 484 ○ ○ INSERT N-1 TONE PAIRS ○ ○ ○ ○ ○ 564 |
| UNIT RETURNS TONE | 1016 Digital Reference Signal | 2016 | 1016 Digital Reference Signal | 2016 | 1016 Digital Reference Signal | 2016 | 1016.if N=odd 2016.if N=even |

| | A | B | RETURNED TONE |
|---|---|---|---|
| | 0 | 0 | 500 Hz |
| | 0 | 1 | 750 Hz |
| | 1 | 0 | 1250 Hz |
| | 1 | 1 | 1750 Hz |

5,327,433

DIGITAL TANDEM CHANNEL UNIT INTERFACE FOR TELECOMMUNICATIONS NETWORK

FIELD OF THE INVENTION

The present invention relates in general to telephone communication systems and is particularly directed to digital tandem channel unit interface, installs, is within an intermediate central office, providing an all digital cross-connect for both voice/data traffic and signalling carried by a digital communications link (e.g. T1 carrier link), while also accommodating analog-based testing of network components.

BACKGROUND OF THE INVENTION

Although the proliferation of digital signal processing equipment has met with widespread acceptance in a variety of industries, telephone companies have been slow to convert to or integrate digital signalling subsystems and communication schemes into their well established copper wire networks. One of the principal reasons for such reticence is the fact that a significant part, if not all, of an established telephone network employs analog signalling equipment. Consequently, to be accepted by the telephone company, any digital product must not only be a cost effective replacement for existing circuitry, but it must be signal-compatible with any remaining analog units of the network to which it may be interfaced.

Most telephone networks currently utilize digital signalling highways to carry voice and data traffic between offices, via a pulse code modulated (PCM) carrier (such as a T1 carrier having a data rate of 1.544 Mb/s), onto which a plurality of (e.g. 24) data channels are multiplexed into serially transmitted frames of digital data. Since the successful completion of a telephone call requires the operation of telephone equipment of the calling and called parties, it is also necessary to include, as part of the communication traffic between offices, additional signals through which such equipment is controlled.

In a conventional . analog environment, such control signalling is realized by the application of prescribed voltages to respective (e.g. tip and ring) leads of a (two or four-wire) analog channel. Because such analog signalling is not possible over a digital link, T1 protocol customarily incorporates the necessary signalling information in the form of control bits, termed A and B bits, into the frames of voice/data traffic carried by the digital communications channel. One accepted industry practice of inserting such control bits into the digitized voice traffic without noticeable corruption of the voice signals is to 'rob' the least significant bit of one or more bytes of a data frame and replace the 'robbed' data bit with a control bit.

In the course of interfacing these frames of digital data at an inter-station location within the T1 link, such as at an intermediate central office, it has been conventional practice to port respective ends of the digital (T1) link to dedicated tandem digital/analog and analog/-digital interface pairs, which are interconnected by way of an analog, cross-connect link, thereby permitting both access to and testing of the central office's equipment by a standard switched maintenance access system (SMAS) or a switched access remote test system (SARTS). Unfortunately, because the digital communication equipments at the respective ports of the intra-office, cross-connect link are mutually asynchronous, it has been necessary to provide an intermediate analog highway in the central office for effecting the transmission of the control information carried by the A and B bits onto the next T1 link.

More particularly, in a leased line application, which conveys only voice or data traffic, a frame of digital data contains no signalling or control, information (A and B bits) that must be extracted from the data stream, so that it is possible to successfully cross-connect the respective T1 ports of the intermediate central office by a digital-only link. However, since a typical T1 channel also can be expected to carry signalling traffic in addition to purely voice/data bytes, some means must be provided to ensure successful transmission and synchronization of the information contained in the signalling bits over the intra-office cross-connect link. As noted above, one conventional technique to handle this problem is to use a separate, dedicated analog pair which carry battery or ground potentials for auxiliary signalling in addition to four-wire link for voice/signalling traffic.

A shortcoming of a conventional 'analog' cross-connect (a traditional motive for which is its ability to accommodate access from analog test equipment, as noted previously) is the fact that all of the voice traffic is subject to potential data corruption by quantization errors that may be introduced in the course of the analog-to-digital conversion of the out going T1 data.

SUMMARY OF THE INVENTION

In accordance with the present invention, the above described limitations of a conventional analog intra-office, cross-connect are obviated by means of an all digital, tandem channel unit interface, which is installable in an intermediate central office in place of a conventional analog tandem pair. The digital tandem channel unit interface in accordance with the present invention is ported to the T1 link and to a four-wire intra-office digital T/R link through which the digital tandem channel unit pair is linked across the office. Because the tandem channel unit interface is an all digital interface, it conveys the entirety of the contents of an incoming T1 digital data channel, including both information signals (voice/data) and telephone equipment operation control signals (A and B bits), over the cross-connect in digital format and thereby avoids potential quantization error corruption of a conventional analog tandem interface.

For this purpose, the digital intra-office tandem channel unit interface of the present invention includes first and second digital communication units coupled in tandem, having first, or line side, ports coupled to the digital carrier link, and second, or drop side, ports coupled to an intra-office (intra-station) cross-connect communication path, the four wire link containing two transmit/receive pairs. Each individual digital communication unit includes respective transmit/receive buffer associated with the first and second ports of that unit. These buffers are controlled by a resident micro-controller for interfacing T1 data traffic from the line side of the unit retiming the traffic as a DS0 data stream for transmission across the central office to the other (tandem) channel unit, and reconverting such digitally transmitted intra-office traffic into T1 format for transmission over an outbound T1 link. Controllably enabled loopback paths are provided between incoming and outbound ports of each side of the unit, so as to permit a line side loopback either at line (T1) side of the unit or a drop side loopback at the drop (intra-office DS0 connect) side of the unit.

In order to effect synchronous insertion of the A and B bits in an outbound T1 data frame, control software resident within the micro-controller monitors incoming T1 data frames and replaces or 'robs' the least significant bit of one of the bytes, other than one containing the A and B bits and the position of which is prescribed relative to the bytes containing the A and B bits, with a bit of a frame synchronization pattern, thereby providing a digitally modified version of an incoming T1 data frame. This framing pattern-modified data is then transmitted over the intra-office digital communications path to the other of the pair of tandem channel units. At the other tandem channel unit of the digital tandem channel unit interface, the framing pattern-modified data is analyzed, in order to locate the framing pattern and thereby locate which bytes contain the A and B bits. Once the framing pattern byte is located and framing synchronization has been achieved, the other tandem channel unit transmits outgoing frames of digital data, predetermined bytes of which contain the A and B bits.

In order to detect the framing pattern, the other tandem channel unit of the interface, to whom the DS0 data frame is forwarded across the office, monitors, as necessary, successively different bytes of respectively successive pluralities of frames of data transmitted over the intra-office communication path, so as to identify in which byte of the frames of data the framing pattern has been inserted. The location of the framing pattern is identified by comparing the contents of the framing bit position (least significant bit) of an arbitrarily selected byte of successive frames of data with respectively rotated versions of the framing pattern.

In response to a match between the two patterns, the location of the framing byte within a DS0 data frame is tentatively placed. Upon detecting the presence of the framing pattern in a prescribed number of successive pluralities of frames, the framing byte is specified, so that the location of the A and B bytes can be identified, thereby enabling the outgoing digital data traffic from the other tandem channel unit to be synchronized with the incoming digital traffic. When frame sync has been achieved, each bit of the framing pattern is replaced with a "1" bit, in order to prevent the framing pattern from being propagated via the outgoing link to another digital tandem channel unit and thereby avoiding potential erroneous operation of a downstream channel unit. If the framing pattern were not replaced, it would be possible for a downstream unit to lock onto the non-replaced framing pattern instead of one actually intended via an intra-office link. By overwriting or replacing each framing bit with a "1" bit, the framing pattern cannot propagate from office to office. Loss of frame sync occurs upon the occurrence of a single bit error in a predetermined plurality of successively identified synchronization pattern bytes, or upon the occurrence of more than a single bit error in the identified synchronization pattern.

As noted above, in order to test the operation and throughput of a communication path through an intermediate central office the telephone companies access the office communication equipment by way of a SMAS point or a SARTS terminal. Since each of these test systems is analog tone-based, the control software within micro-controller of the digital tandem channel unit interface of the present invention contains a test tone response capability that permits the interface to accept digitized test tones, sourced from the test system and return a reply tone that is compatible with the analog signalling requirements of the test system. In addition, at a digital access point between the tandem channel unit pair, battery/ground simplex voltage may be applied to support additional testing of the interface.

More particularly, to test the throughput and attenuation. parameters of a signal transmission path containing a T1 link and that tandem channel unit to which the T1 link is ported, prescribed simplex reference (battery/ground) voltages are applied by a service test center from a test access point to respective portions of the cross-connect four-wire link. In response to these reference voltages the tandem channel unit transmits a first prescribed tone signal via the T1 port onto the digital (T1) link to a remote station, to an analog channel port of which the service test center is coupled. Tone signal verification and tone level measurements are then conducted via the analog channel port of the remote station. Depending upon these measurements, the attenuation parameters of an attenuation device at the remote station end of the T1 link is adjusted.

For testing the continuity and attenuation of the signal path containing the T1 link and the cross-connect link through the intermediate central office a test tone signal may be applied from the service test center to the (analog) channel port of a first station, so that said tone signal is digitized and transmitted over the T1 link to the intermediate central office. At an analog channel port of a second station, tone verification and tone level measurements are carried out with respect to the tone signal.

In order to conduct continuity checks and transmission level validation through a DS0 loopback path through the interface, a first tone loopback sequence may be employed. The procedure carried out by the service test center depends upon whether the analog channel of the end office accessed by the test center is a four-wire or a two-wire circuit. In the case of a four-wire circuit, its full duplex capability permits transmission and monitoring of a test tone to be conducted simultaneously.

For a four-wire circuit, a first tone sequence is applied from the service test center to the analog channel port of a first station, which digitizes the tone sequence and transmits it over the T1 link to the intermediate office. The micro-controller within a tandem channel unit of the interface to which the T1 link is ported responds by executing a DS0 loopback and returns a first prescribed tone signal over the T1 link. The service test center then conducts tone verification and tone level measurements with respect to the first prescribed tone signal from the analog port of the first station. In particular the service test center adjusts an attenuation characteristic of the communication path through which the first prescribed tone signal is received at the analog channel port of the first station. To test the attenuation of the communication path through which signals are transmitted from the first station, the service test center transmits a second prescribed tone, which is returned via the loopback path from the tandem channel unit, and monitors the level received tone, so that the transmit attenuation may be adjusted, as necessary.

In order to conduct continuity checks and transmission level validation through loopback path at the T1 port of the far end of the interface, a second tone loopback sequence may be employed. The second tone sequence includes the tones of the first tone sequence plus an additional tone pair which indicates that the loopback test is to be conducted with respect to the far end tandem channel unit. As in the case of the first tone sequence, the second tone sequence is applied from the service test center to an analog channel port of the first station, which digitizes the tones and transmits the digitized sequence over the T1 link to the intermediate station. The micro-controller in the far end tandem channel unit of the interface responds to the second tone sequence by providing a far end loopback path to the T1 link and returns a third prescribed tone signal to the first station. The service test center then conducts tone verification with respect to the third prescribed tone signal from the analog port of the first station.

Where the network contains a plurality of intermediate offices coupled in cascade within the T1 digital communication link between respective end stations, testing of a tandem channel unit of the interface of a selected intermediate office station is carried out by incorporating additional pairs of tones into the first tone sequence, the number of additional pairs identifying at which tandem channel unit in the chain of tandem channel unit pairs of the cascaded intermediate offices the loopback test is to be conducted. As long as the tandem channel unit to be tested is the near end tandem channel unit, relative to the incoming tone signal from the T1 link, both tone loopback verification and attenuation tests are conducted via the tandem channel unit's return of the first prescribed tone and the use of the second prescribed tone for transmit attenuation measurements. However, where the tandem channel unit to be tested is the far end tandem channel unit, relative to the incoming tone signal from the T1 link, only tone loopback verification of the third prescribed tone is carried out.

As noted earlier, the test procedure carried out by the service test center depends upon whether the analog channel of the end office accessed by the test center is a four-wire or a two-wire circuit. In the case of a two-wire circuit, the foregoing test methodology is modified to accommodate its half-duplex capability, which does not permit simultaneous transmission and monitoring of a test tone.

To conduct look, back testing of a tandem channel unit within a respective intermediate station from a two-wire analog channel port of an end station, the service test center first interrupts the cross-connect, intra-station digital communications link between the tandem channel units of the intermediate station and then applies the above-described first tone sequence to the two-wire analog channel port of the end station. The tone sequence is digitized and transmitted over the T1 link to the near end tandem channel unit of the intermediate station.

As in the case of conducting the test through a four-wire circuit, the micro-controller of the near end tandem channel unit responds to the first tone sequence by executing a DS0 loopback and returns a first prescribed tone signal over the T1 link to the end station. The service test center switches the SARTS/SMAS connection at the two-wire analog channel port of the end office in order that it may verify and monitor the level of the first prescribed tone returned by the tandem channel unit, the service test center adjusting the attenuation of the signal path through which the first prescribed tone signal is received at the end station.

After conducting this first loopback test through the near end tandem channel unit, the service test center terminates the near end loopback path and applies the first tone sequence to a two-wire analog channel port of a second end station, which digitizes the first tone sequence and transmits the digitized tone sequence over the T1 link to the other tandem channel unit of the intermediate station. In response to the first tone sequence, the micro-controller of the other tandem channel unit executes a DS0 loopback toward the second end station and returns the first prescribed tone signal over the T1 link to the second end station. The service test center then switches the SARTS/SMAS connection at the two-wire analog channel port of the second end station in order that it may verify and monitor the level of the first prescribed tone returned by the tandem channel unit, the service test center adjusting the attenuation of the signal path through which the first prescribed tone signal is received at the second end station.

After making whatever adjustments are necessary in the signal path through which the test tone signals are received via the analog channel ports of the two end stations of the network, the service test center reestablishes the cross-connect link of the intermediate station and applies a second test tone signal to the two-wire analog channel port cf the first end station, which digitizes the second test tone signal and transmits the digitized second test tone signal over a digital communications path containing the T1 link from the first station to the intermediate office, the reconnected cross-connect path through the intermediate office, and the T1 link to the second end station. Via the analog channel port of the second end station, the service test center conducts tone verification and tone level measurements with respect to the second test tone signal. Then, based upon the measurements at the second end station, the service test center then adjusts the attenuation characteristic of the signal transmission path through which the second test tone signal is transmitted from the first station.

After making adjustments in the signal path through which the second test tone is transmitted via the analog channel port of the first end station, the service test center carries out a reciprocal test source via the analog channel port of the second end station. Specifically, the service test center applies the second test tone signal to the two-wire analog channel port of the second end station, which digitizes the second test tone signal and transmits the digitized second test tone signal over a digital communications path containing the T1 link from the second station to the intermediate office, the reconnected cross-connect path through the intermediate office, and the T1 link to the first end station. Via the analog channel port of the first end station, the service test center conducts tone verification and tone level measurements with respect to the second test tone signal. Then, based upon the measurements at the first end station, the service test center then adjusts the attenuation characteristic of the signal transmission path through which the second test tone signal is transmitted from the second station.

Where the network contains a plurality of intermediate offices coupled in cascade within the T1 digital communication link between respective end stations that employ two-wire analog circuits, testing of a tandem channel unit of the interface of a selected intermediate office station is initiated in the same manner as in the case of accessing the tandem channel unit via a four-wire circuit. Namely, the tandem channel unit of interest is selected by incorporating additional pairs of tones into the first tone sequence, the number of additional pairs identifying at which tandem channel unit in the chain of tandem channel unit pairs of the cascaded intermediate offices the loopback test is to be conducted. The methodology described above for one of the tandem channel units of a tandem channel unit pair is carried out for the selected tandem channel unit, the service test center interrupting the cross-connect of the tandem channel unit pair and conducting tone testing from an end station on the far side of the interrupted cross-connect relative to the tandem channel unit to be tested. As long as the tandem channel unit to be tested is the near end tandem channel unit, relative to the incoming tone signal from the T1 link, both tone verification and attenuation tests are conducted via the tandem channel unit's DS0 loopback return of a test tone.

Thus, for testing a near end tandem channel unit, which provides a loopback path through a DS0 link, the service test center initially interrupts the cross-connect link between the near end tandem channel unit and the far end tandem channel unit of the selected intermediate station. It then applies a prescribed tone sequence to the two-wire analog channel port of the accessing end station, the prescribed tone sequence being uniquely associated with the tandem channel unit to be tested. The tone sequence is digitized and transmitted over the T1 link to the near end tandem channel unit.

In response to this tone sequence, the resident micro-controller of the selected tandem channel unit executes a DS0 loopback and returns a first test tone to the end station. The service test center switches its SARTS/SMAS connection to the analog channel port of the end station and conducts tone verification and tone level adjustment with respect to the first test tone.

For testing a far end tandem channel unit, which provides a DS0 loopback path to a far end T1 link, the service test center interrupts the cross-connect link between the far near end tandem channel unit and the far end tandem channel unit of the selected intermediate station. It then applies a prescribed tone sequence to the two-wire analog channel port of a far end accessing station, the prescribed tone sequence being uniquely associated with the selected far end tandem channel unit to be tested. The tone sequence is digitized and transmitted over the T1 link to the far end tandem channel unit. In response to this tone sequence, the resident micro-controller of the selected tandem channel unit again executes a DS0 loopback and returns the test tone to the far end station. The service test center switches its SARTS/SMAS connection to the analog channel port of the far end station and conducts tone verification and tone level adjustment with respect to the test tone.

Upon adjusting the attenuation of the signal path through which the test tone signals are received via the analog channel ports of the two end stations of the network, the service test center reestablishes the cross-connect link of the intermediate station and applies a second test tone signal to the two-wire analog channel port of the first end station, which digitizes the second test tone signal and transmits the digitized second test tone signal over a digital communications path containing the T1 link, each cascaded intermediate office in the link including reconnected cross-connect paths through these intermediate offices, and the T1 link to the Second end station. Via the analog channel port of the second end station, the service test center conducts tone verification and tone level measurements with respect to the second test tone signal. Then, based upon the measurements at the second end station, the service test center then adjusts the attenuation characteristic of the signal transmission path through which the second test tone signal is transmitted from the first station.

After making adjustments in the signal path through which the second test tone is transmitted via the analog channel port of the first end station, the service test center carries out a reciprocal test source via the analog channel port of the second end station. Specifically, the service test center applies the second test tone signal to the two-wire analog channel port of the second end station, which digitizes the second test tone signal and transmits the digitized second test tone signal over a digital communications path containing the T1 link from the second station through the cascaded intermediate offices including reconnected cross-connect paths through these offices, and the T1 link to the first end station. Via the analog channel port of the first end station, the service test center conducts tone verification and tone level measurements with respect to the second test tone signal. Then, based upon the measurements at the first end station, the service test center adjusts the attenuation characteristic of the signal transmission path through which the second test tone signal is transmitted from the second station.

In addition to providing the capability to test the continuity and attenuation characteristics of the voice/data transmission path through one or more tandem channel unit pairs, the present invention also allows for testing the ability of the signalling path through which the operation control signals (A/B bits) are conveyed For this purpose, the buffer control software within a respective tandem channel unit's micro-controller is such that the signalling state specified by the last received A/B bits is stored. Storing this information permits signalling conditions, such as tip-to-ground, to be established before interrupting the cross-connect by way of a test access point.

To conduct a signalling test the service test center accesses the network from the analog channel port of an end office and if necessary, establishes a precursor line condition at that port. It then applies a prescribed telephone equipment operation control signal to place a stable signalling condition (e.g. idle, ground-on-ring, loop closure, reverse battery) on the analog channel port. The end station encodes the prescribed control signal into its the A/B bits positions of a digital data frame and transmits the digital data frame over the digital communications link to the intermediate station.

The service test center then interrupts the cross-connect path of the accessed office so as to break the connection between the near end tandem channel unit and the far end tandem channel unit, and applies simplex voltages on the near end channel unit four wire pair. The micro-controller of the near end tandem channel unit responds by returning a tone signal representative of a telephone equipment operation as specified by the contents of the A/B bits at the time of the simplex voltage application in the carrier toward the analog channel port of the end station, where the service test center is monitoring whether or not the tone is correct. The service test center monitors the analog channel port of the end station for the return of the tone signal from the near end tandem channel unit and verifies that the returned tone is correct for the signalling condition specified in the transmitted A/B bits. The service test center repeats the above procedure as necessary to test other signalling conditions for the near end tandem channel unit. To test the far end tandem channel unit, the service test center carries out the above procedure from the second test station.

The communication protocol employed by the micro-controller of a tandem channel unit verifies the signalling path across the intra-office path through both units if two conditions are satisfied: first—the signalling path to the near end tandem channel unit (relative to the end station accessed by the service test center) is valid; and secondly, tone loopback is successful from the far end tandem channel unit. Once the signalling path has been tested with respect to the near end tandem channel unit of the interface, then, if the end station-to-end station link has been tested to be valid, the signalling path is known to be valid through the interface.

BRIEF DESCRIPTION OF THE DRAWINGS

FIGS. 2A, 2B and 2C are timing diagrams associated with the operation of the digital tandem channel unit of FIG. 2;

FIG. 8 contains a Table A which sets forth the relationship between tandem channel unit position along the link relative to the end station from which the service test center conducts loopback testing and the particular tone sequence to be employed for that channel unit position;

DETAILED DESCRIPTION

Figure 1:
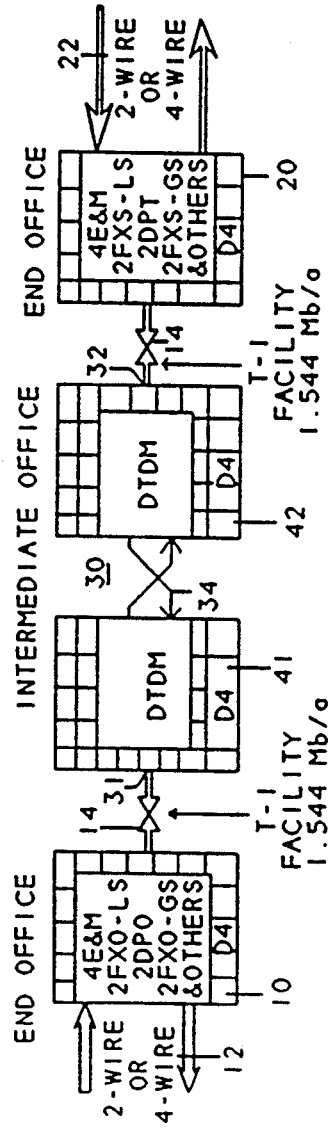
FIG. 1 diagrammatically illustrates a simplified example of a representative digital carrier telephone network with which the digital tandem channel unit interface of the present invention is intended to be used.

Before describing in detail the all digital tandem channel unit interface in accordance with the present invention, it should be observed that the interface resides in what is effectively a tandem connection of a pair of reduced complexity hardware modifications of a conventional data port (DS0 DP), together with an augmentation of the control software employed by the data port's micro-controller. The details of the circuitry of the data port are otherwise essentially unaffected. Accordingly, the configuration of such a tandem channel unit and the manner in which it is interfaced with other communication equipment of the telephone network have been illustrated in the drawings by readily understandable block diagrams which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system k a convenient functional grouping, whereby the present invention may be more readily understood.

FIG. 1 diagrammatically illustrates a simplified example of a representative digital carrier telephone network with which the digital tandem channel unit interface of the present invention is intended to be used. The network itself is shown as comprising a first end station 10, located at the 'west' end of the network as viewed in the Figure, which is coupled via a two or four-wire interface 12 to analog, digital communication equipment served by the network, and to an all digital communication link 14, such as a T1 (1.544 Mb/s) link, through which frames of digital data are carried between 'west' end office 10 and other stations of the network. The network further includes a second end station 20, located at the 'east' end of the network. End station 20 is couple]via a two or four-wire interface 22 to analog, digital communication equipment served by the network, and to T1 link 14. The particular equipment resident in end offices 10 and 20 is not limited to a specific type and may include any of a variety of circuits employed for voice/data communications, with or without signalling capability, including, but not limited to, analog voice frequency circuits (with or without signalling), digital data terminal communication equipment, such as Switched 56-Datapath (Registered Trademark it Northern Telecom), Accunet (Registered Trademark AT&T), VPN-56 (Registered Trademark U.S. Sprint), add directed DDS operation circuits.

Interposed within digital link 14 is an intermediate central office 30. A pair of channel units 41 and 42 interconnected in tandem by way of an intra-office cross connect 34, network 14 is coupled to port 31 of 'west' channel unit 41, while network 14 is coupled to port 32 of 'east' channel unit 42. Intra-office cross connect 34 (typically on the order of 1500 feet of communication cable) between data ports 31 and 32 of intermediate central office 30 is formed of a four-wire transmit/receive pair.

As pointed out briefly above, a respective digital tandem channel unit is ported to interface frames of DS1 data with a T1 link and corresponding frames of DS0 data with the four-wire intra-office digital link (T,R; T1,R1 pairs) through which the digital tandem channel unit pair is linked across the office. Thus, 'west' channel unit 41 is ported to T1 link 14 and to intra-office four wire pair 34, at the 'west' port 31 of the central office 30, while 'east' channel unit 42 is ported to T1 link 14 and to intra-office four wire pair 34, at the 'east' port 32 of the central office 30. As will be described more fully below with reference to FIG. 2, each individual digital channel unit includes respective transmit/receive buffers associated with the DS1 and DS0 ports of that unit. These buffers are controlled by a resident micro-controller for interfacing T1 data traffic from the line (T1 link) side of the unit, retiming the traffic as a DS0 data stream for transmission across the central office drop 34 to the other (tandem) unit, and reconverting DS0 data frames into T1 format for transmission over an outbound T1 link. In addition, controllably enabled loopback paths are provided between the DS1 and DS0 ports of the unit, so as to permit a channel loopback either at the line side of the unit or at the drop side of the unit.

Figure 2A:
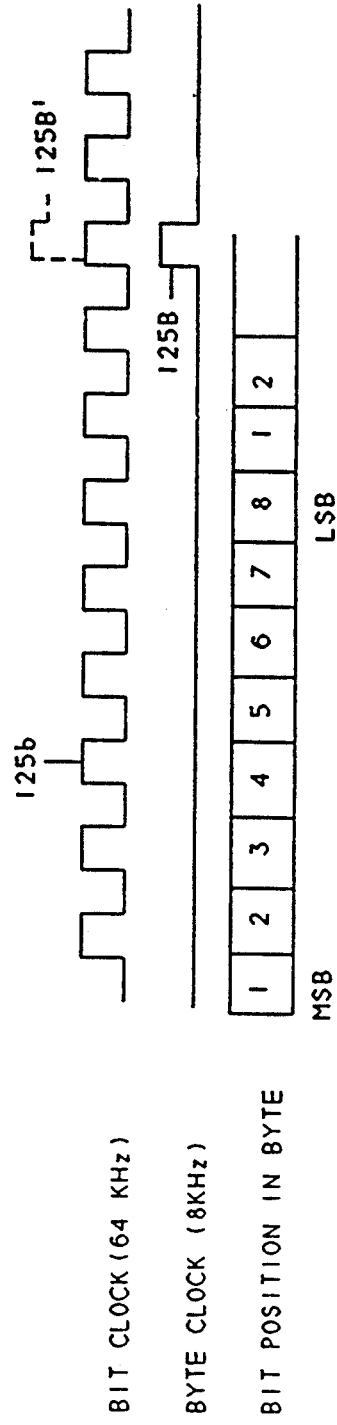
Figure 2:
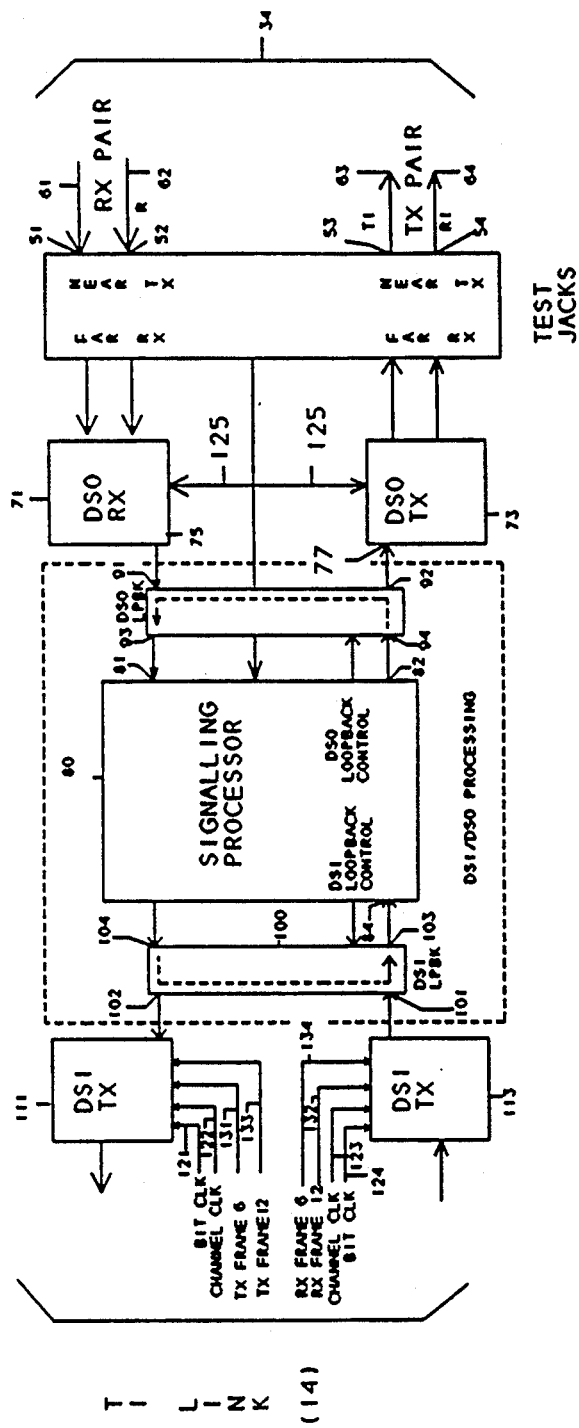
FIG. 2 diagrammatically illustrates the configuration of a digital tandem channel unit.

FIG. 2 diagrammatically illustrates the configuration of a DS0 data port, such as a Model No. 1103003L1, manufactured by Adtran Corporation, Huntsville Ala., that has been modified in accordance with the present invention to function as an individual one of a pair of digital tandem channel units, which are cross-coupled through a four-wire pair, so that an intermediate central office may be digitally coupled with a digital carrier (T1) link and accessed by a service test center for both transmission and signalling capability testing.

As pointed out previously, since the invention resides primarily in a hardware modification of a conventional office channel unit data port and enhancements to the control software employed by the data port's microcontroller, the configuration and operation of those components of the DS0 data port that are conventional will only be generally described. Where more detail is desired attention may be directed to equipment itself and to information supplied by the manufacturer of such equipment, such as that identified above.

As shown in FIG. 2, a digital tandem channel unit in accordance with the present invention comprises a four-wire test access interface 50, comprised of tip (T) and ring (R) input and output port pairs 51, 52 and 53, 54 to which respective tip and ring (T,R) lines 61 62 and tip and ring (T1,R1) lines 63, 64 of four wire cross connect link 34 are coupled. Test access interface 50 is a test jack through which a test can access either into the processor using the FAR TX and FAR RX ports, such that a connection is established from the FAR TX port into the network on the T link and back to be received at the FAR RX port. Conversely, when using the other pair of ports, the NEAR TX and NEAR RX ports allow connection to the intra office wiring over to the other digital tandem channel unit for test access. When using the test jack in the far or near direction, the action of inserting the connection breaks the complementary port connection. For example, inserting the connection to the FAR TX, RX ports, presents an open circuit to the NEAR TX, RX ports for the intra office link to the other side of the office.

Interface 50 couples respective tip and ring inputs 51, 52 through a line coupling transformer (not shown) to a bipolar receiver within a DS0 receive buffer unit 71. DS0 receive buffer unit 71 comprises a bipolar receiver, which decodes an incoming 64 KHz bipolar non-return to zero (NRZ) DS0 signal on the intra-office cross connect 34 and buffers the converted binary data frames for processing (retiming and retransmission) by an attendant micro-controller 80, which receives timing from the office in the form of a DS0 clock 125 comprised of a (64 KHz) bit clock 125$b$, shown in FIG. 2A. An edge (e.g. the rising edge) of bit clock 125$b$ corresponds to the time at which data is sampled and buffered in the receive buffer unit 71. Byte alignment is achieved with an (8 KHz) byte clock 125B, such that, when the byte clock is active at the last (eighth) bit in the byte the word is buffered. In a preferred embodiment of the invention, bit clock 125$b$ and byte clock 125B are integrated in a common clock signal corresponding to the bit clock 125$b$ shown in FIG. 2A, with every eighth clock pulse having an amplitude twice that of the other clock pulses., as shown at 125B$^1$, to derive the byte clock.

As further shown in FIG. 2A, the most significant bit (MSB) is bit 1, and the least significant bit (LSB) is bit 8 While the duty cycle of each of the bit and byte clocks may be 50%, as illustrated, other duty cycles may be used, such as a 62.5% ($\frac{5}{8}$) high and 37.5% ($\frac{3}{8}$) low. In addition, the data has a bipolar format, with each successive "one" having an opposite polarity and a "zero" is zero ground potential. At the time of buffering the sampled data, the bipolar data is converted into a digital TTL format (a binary "0" is represented by ground potential and logical "1" is at 5 volts).

The 64 KHz data is coupled over line 91 to input port 81 of signalling process (micro-controller) 80. This data contains only the digital data that may represent digitized tones and may include the signalling bit path in prescribed frames, plus the framing bit from the DS0 encoder at the other side of the office. This framing bit is used to detect the signalling pattern (but not data byte alignment).

For outbound, cross-connect DS0 data, T/R interface 50 couples respective tip and ring outputs 53, 54 through a line coupling transformer (not shown) and through the test jack position from a bipolar transmitter within a DS0 transmit buffer unit 73. Under the control of micro-controller 80, unit 73 buffers outbound frames of binary data DS0, which are controllably supplied, in accordance with the bit clock 125$b$ and byte clock 125B of clock line 125, to a bipolar transmitter for encoding and transmission as an outbound 64 KHz bipolar non-return to zero (NRZ) DS0 signal on the intra-office cross connect 34 to the other tandem unit of the channel unit pair. For outgoing data, the falling edge of the bit clock 125$b$ is used to place the data on the outbound transmit ports 53, 54 and the byte clock 125B is used for alignment.

Receive buffer unit 71 has its output port 75 coupled to a first port 91 of a DS0 loopback relay interface 90, while transmit buffer unit 73 has its input port 77 coupled to a second port 92 of DS0 loopback interface 90. DS0 Loopback interface 90 may be comprised of a set of controlled relay contacts, the open/closure states of which are defined in accordance with switching control signals from micro-controller 80, or its functionality may be incorporated into the signal processing operation of micro-controller 80. In its normal non-loopback condition, interface 90 couples DS0 receive port 91 to port 93 and DS0 transmit port 94 to port 92. For a DS0 or drop side loopback, the receive and transmit communication paths through ports 91–93 and 94–92, respectively, are interrupted and a loopback path is effected through interface 90 from transmit port 94 to receive port 93.

Receive output port 93 of DS0 loopback interface 90 is coupled to a transmit input port 104 of a DS1 loopback interface 100. Like DS0 loopback interface 90, DS1 loopback interface 100 may be comprised of a set of controlled relay contacts, the open/closure states of which are defined in accordance with switching control signals from micro-controller 80 or its functionality may be incorporated into the signal processing operation of micro-controller 80. In its normal non-loopback condition, DS1 loopback interface 100 couples a DS1 receive input port 101 to DS1 receive output port 103 and DS1 transmit output port 102 to DS1 transmit input port 104. For a DS1 or line side loopback, the receive and transmit communication paths through ports 101–103 and 104–102, respectively, are interrupted and a loopback path is effected through interface 100 from transmit port 104 to receive port 103.

DS1 transmit port 102 of loopback interface 100 is coupled to a DS1 transmit buffer unit 111, while its DS1 receive port is coupled to a DS1 receive buffer unit 113. DS1 transmit buffer unit 111 comprises a set of cascaded holding registers into which a decoded DS0 data stream is loaded by a DS0 byte clock in the course of transmission out over the T1 link 1.4, in order to prevent byte slips resulting from phase shifts between the 64 KHz DS0 and 1.544 DS1 data clocks. DS1 Transmit buffer unit 111 is unloaded in accordance with the transmit (T) link clock signals shown in FIG. 2B. As shown therein, T link timing is comprised of a transmit bit clock 121 at 1,544 MHz, which is coupled to the cascaded holding registers of the buffer unit. Channel ID clock 122 is associated with a specified channel n, (where 1<n<24) within the twenty-four channels handled by the unit. As shown in FIG. 2B, the channel ID clock 122 occurs in advance of the channel (n) first bit timing (b1). On the next rising edge of the transmit bit clock 121 the data begins being clocked out onto the DS1 link during time slot n.

Similarly, DS1 receive buffer unit 113 comprises a set of cascaded holding registers into which an incoming PCM (T1) data stream is downloaded by DS1 bit clock 124 and byte clocks when the channel unit is enabled to receive T1 data in accordance with DS1 receive (R) timing signals shown in FIG. 2C. As shown therein, R link timing is comprised of a receive bit clock 124 at 1.544 MHz, which is coupled to the cascaded holding registers of receive buffer unit 113. A channel ID clock 123 is associated with a specified channel n. The falling edge of channel ID clock 123 is used to parallel shift the data into the cascading holding registers of unit 113. The bit clock is used to serially shift and align the PCM data (sampled on the falling edge of receive bit clock 124). The falling edge of channel ID clock 123 is used to parallel-shift the data into the cascading holding registers DS1 buffer unit 113. The receive holding registers are unloaded synchronously by the DS0 bit and byte clocks to form the outbound DS0 data stream for transmission to the cross connected tandem channel unit. Also shown in FIG. 2 are transmit (TX) frame 6 line 131 and transmit frame 12 line 133, which are coupled to DS1 transmit buffer unit 111, and receive (RX) frame 6 line 134 and receive frame 12 line 132, which are coupled to DS1 receive buffer unit 113. These signals are derived from channel bank timing signals, that identify where frame 6 and frame 12 occur within the time division multiplex data that is transmitted over the T link. The frame 6 and frame 12 identification signals are used to load or receive the A bit (from frame 6) and the B bit (from frame 12) of channel n's time slot.

More particularly, the contents of DS1 receive buffer unit 113 are synchronously unloaded by the DS0 clock in accordance with the DS0 clock, and accommodates phase shifts between the 1.554 DS1 data clock and the 64 MHz DS0 clock. The unloaded data stream is then coupled through ports 101–103 of interface 100 to port 84 of signalling processor 80. Signalling processor 80 robs the least significant bit of a prescribed byte of a DS0 data frame to include an additional framing bit taken from a prescribed framing sequence, such as the repeated framing pattern '1110010'. The processor also controllably inserts prescribed control codes, such as a 'loss of signal' code byte to be substituted for DS0 data when there is a loss of signal or a unit coupled to the channel is asserted quiet (turned off). During micro-controller sourced (synthesized) tone generation, the data bytes comprise the amplitude sampled values of a 1016 Hz tone at 0.0 dBm0. Thus, to synthesize a 1016 Hz tone, a prescribed order of digital bytes are transmitted at a controller rate, such that the samples will be reconstructed into a 1016 Hz waveform via the common equipment of the channel bank in the end office.

The 64 Kb/s data stream is coupled to an NRZ encoder within transmit buffer 73 which encodes the data stream into a bipolar, non return-to-zero format. The bipolar data is transmitted in synchronism with bit and byte clocks, whereby the output comprises a pair of alternating positive and negative pulses of 100% duty cycle, where a logical "one" is represented by a positive or negative pulse and a logical "zero" is represented by a zero (ground) potential. These signals are coupled to bipolar signal line drivers. These line drivers drive the secondary winding of the coupling transformer, which is coupled to tip and ring (T1, R1) output ports 53 and 54, to which the T1 and R1 lines 63, 64 of the intra-office link 34 are coupled.

OPERATION

Frame Synchronization

As pointed out above, one of the problems associated with a conventional 'analog' intra-office cross-connect tandem channel unit pair is the fact that a conventional tandem unit converts the incoming T1 data stream into analog format, so that all of the traffic is subject to potential data corruption by quantization errors that may be introduced into the data stream in the course of the analog-to-digital conversion of the outgoing T1 data. Additionally, it is sometimes necessary to use an extra pair of wires merely to provide for control signalling increases the hardware intensity of the intra-office analog channel.

In accordance with the present invention, these drawbacks are eliminated by a control software mechanism resident within the micro-controller, which is able to synchronously insert the A and B bits in an outbound T1 data frame, without the need to first convert the DS1 data into analog format (and without the need to provide an additional two wire path as is sometimes employed for auxiliary signalling, as described previously).

Pursuant to the invention, control software resident within micro-controller 80 monitors incoming DS1 data frames and replaces or 'robs' the least significant bit of one of the bytes, which may include or exclude a byte containing an A or B bit, and the position of which is prescribed relative to the bytes containing the A and B bits, with a bit of a frame synchronization pattern, thereby providing a digitally modified version of an incoming DS1 data frame as an outbound DS0 data frame. The A and B bits are buffered in advance of the replacement so that they can be reinserted in correct alignment with the synchronization pattern. This framing pattern-modified DS0 data is then transmitted over the intra-office four-wire pair 34 to the other of the pair of tandem channel units.

Figure 3:
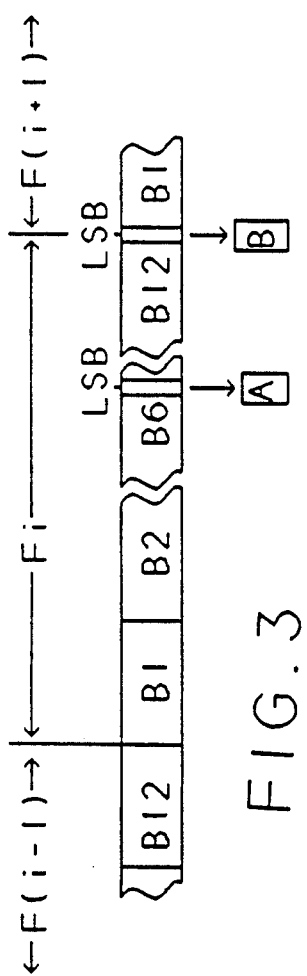
FIG. 3 shows an arbitrary DS1 data frame Fi and portions of immediately preceding data frame F(i−1) and immediately succeeding dataframe F(i+1)
Figure 4:
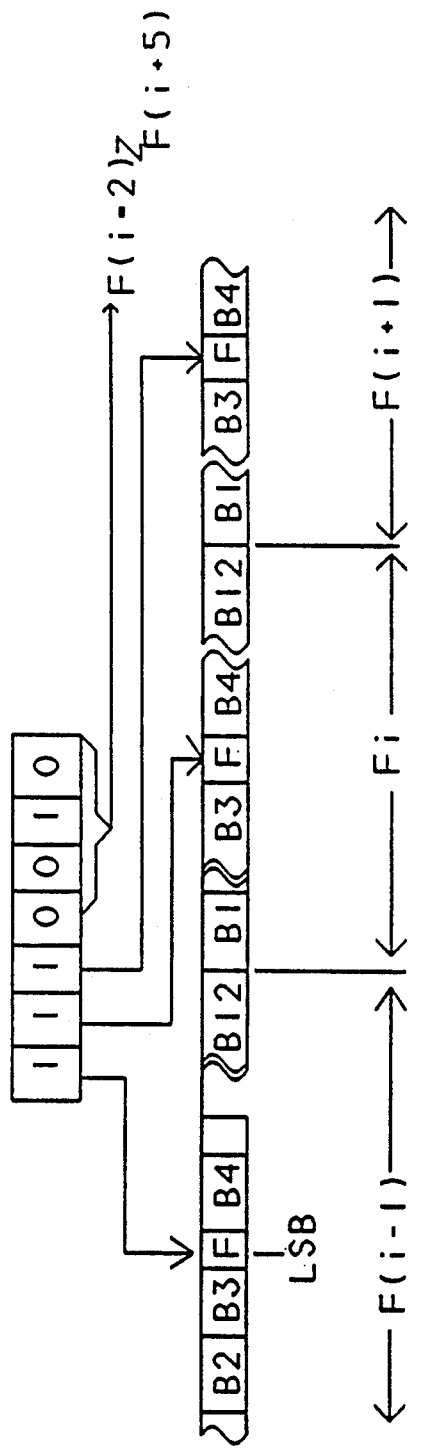
FIG. 4 diagrammatically illustrates how successive ones of the bits of the framing pattern 1110010 are substituted in place of the LSB of the third byte (B3) of a successive ones of DS0 data frames that are forwarded onto the intra-office link of tandem channel unit pair.

More particularly, FIG. 3 shows an arbitrary DS1 data frame Fi and portions of immediately preceding data frame F(i−1) and immediately succeeding data frame F(i+1), each frame containing twelve data bytes B1-B12. The respective bytes of a DS1 data frame are identified by micro-controller 80 in accordance with the DS1 framing protocol and, typically, the least significant bits of bytes six (B6) and twelve (B12) contain respective A and B control bits. For extended superframe protocol having twenty-four bytes per frame, whereby bytes six and twelve, respectively, contain A and B bits and bytes eighteen and twenty-four have repeated A and B bits or additional C and D signalling bits, respectively. In order to achieve byte synchronization for the DS0 data at the other tandem channel unit, micro-controller 80 substitutes successive ones of the bits of the framing pattern 1110010 in place of (or 'robs') the LSB of the third byte (B3) of successive DS0 data frames that are forwarded onto intra-office link 34, as diagrammatically illustrated in FIG. 4.

Figure 5:
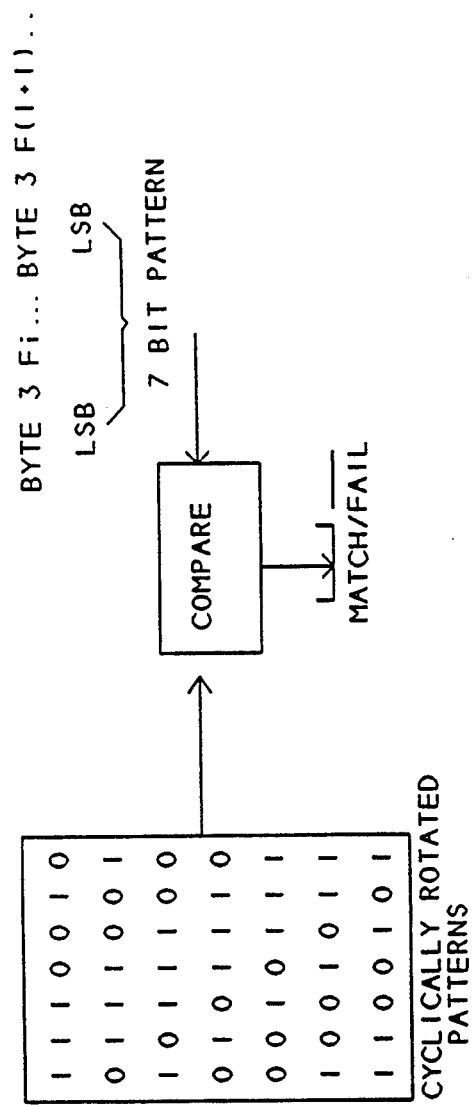
FIG. 5 diagrammatically illustrates how the tandem channel unit's micro-controller arbitrarily selects one of the bytes of an incoming DS0 data frame as byte (B3) and compares the contents of the LSBs of the selected byte B3 for a sequence of seven consecutive DS0 data frames with each of the possible single bit shifted versions of the framing pattern.

At the DS0 frame-receiving tandem channel unit of the interface, each framing pattern-modified DS0 data frame is analyzed by the micro-controller in order to locate the framing pattern and thereby locate which bytes contain the A and B bits. For this purpose, micro-controller 80 arbitrarily selects one of the bytes of an incoming DS0 data frame as byte (B3) and compares the contents of the LSBs of the selected byte B3 for a sequence of seven consecutive DS0 data frames with each of the possible single bit shifted versions of the framing pattern, as diagrammatically illustrated in FIG. 5. If the sequence of LSBs of the arbitrarily chosen third bytes of seven successive DS0 frames do not match any of the stored cyclically rotated versions of the framing pattern, the byte examined is shifted by one byte and the process is repeated until a match occurs. Once a match occurs, the framing byte of third byte of a DS0 frame is tentatively identified. If the match is repeated for three successive frames, the framing byte is specified, so that the location of the A and B bytes can be identified and, consequently the sixth and twelfth bytes containing the A and B bits are identified, enabling the DS1 data-transmitting tandem channel unit to synchronously frame the bytes of each outgoing frame of DS1 data. When frame sync has been achieved, micro-controller 80 replaces each bit of the framing pattern with a "1" bit in order to prevent the framing pattern from being propagated via the outgoing DS1 link to another digital tandem channel unit, and thereby avoiding potential erroneous operation of a downstream channel unit. If the framing pattern were not replaced, it would be possible for a downstream unit to lock onto the non-replaced framing pattern instead of one actually intended via an intra-office link. By overwriting or replacing each framing bit with a "1" bit, the framing pattern cannot propagate from office to office.

With frame sync achieved, micro-controller 80 also continues to monitor each frame of incoming DS0 data and will indicate a loss of frame sync upon the occurrence of potentially faulty conditions. Specifically, a loss of frame sync signal is generated upon the occurrence of a single bit error in a predetermined plurality of successively identified synchronization pattern bytes, or upon the occurrence of more than a single bit error in the identified synchronization pattern.

COMMUNICATION LINK CONTINUITY, ATTENUATION TESTING

As explained previously, to test the operation and throughput of a communication path through an intermediate central office the telephone companies customarily access the office communication equipment by way of a SMAS point or a SARTS terminal. Since each of these test systems is analog tone-based, the control software within micro-controller 80 contains a test tone response capability that permits the interface to accept test tones, sourced from the test system and return a reply tone that is compatible with the analog signalling requirements of the test system. In addition, at a digital access point between the tandem channel unit pair, battery (−48 v D.C.)/ground simplex voltage may be applied to support additional testing of the interface.

SINGLE TANDEM CHANNEL UNIT TESTING (FIG. 6)

Figure 6:
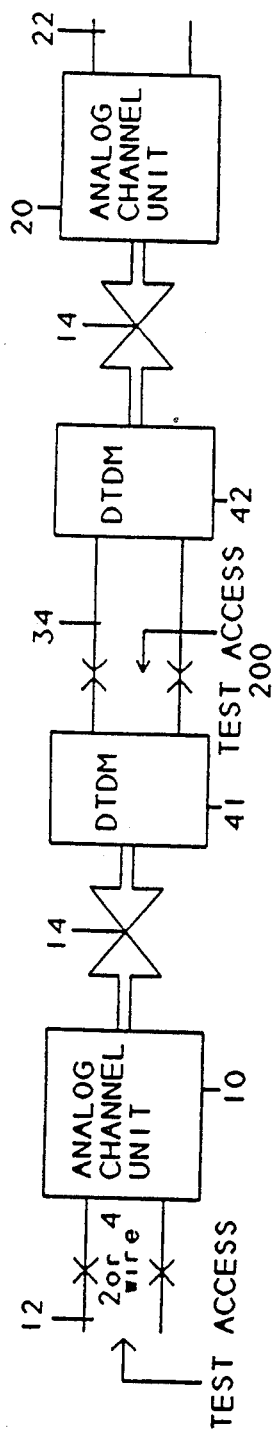
FIG. 6 corresponds to the diagrammatic illustration of the reduced complexity digital carrier telephone network of FIG. 1, together with test access points through which a service test center carries out transmission testing methodology of the present invention.

FIG. 6 essentially repeats the diagrammatic illustration of the reduced complexity digital carrier telephone network of FIG. 1, together with test access points through which a service test center carries out transmission testing methodology in accordance with the present invention.

To test the throughput and attenuation parameters of a signal transmission path containing T1 link 14 and the tandem channel unit to which the T1 link is ported, such as tandem channel unit 41, the service test center accesses the central office on the drop side of tandem channel unit 41, namely it accesses the intra-office four-wire pair 34 at test point 200 and applies prescribed simplex reference voltages (battery) on the T1/R1 and (ground) on the T/R leads of the cross-connect four-wire link 34. The testing mechanism within micro-controller 80 responds to these potentials applied to the T1/R1 and T/R leads by synthesizing out a first reference tone (1016 Hz, 0.0 dBm) via the T1 port 31 onto digital (T1) link 14 to the west end station 10. Via the analog channel port 12 of west station 10, the service test performs tone signal verification and tone level measurements with respect to the synthesized 1016 Hz tone. Depending upon these measurements, the attenuation parameters of a receive attenuation pad at west station 10 are adjusted. This procedure is repeated via tandem channel unit 42 for the east end direction of the link, with the service test center performing tone signal verification and tone level measurements with respect to the synthesized 1016 Hz, 0.0 dBm tone via analog channel port 22 of east station 20, and adjusting, as necessary, attenuation parameters of a receive attenuation pad at east station 20.

Then, to test the continuity and attenuation of the signal path containing T1 link 14 and the cross-connect link 34 through intermediate central office 30, the cross-connect access point 200 is removed from link 34 to renormalize the station-to-station link and a second reference tone (1004 Hz, 0.0 dBm) is applied by the service test center to one of the end stations, such as port 22 of east station 10, so that tone verification and tone level measurements with respect to the 1004 Hz tone may be conducted via the other station, such is port 12 of west station 20. At west station 10, the service test center verifies receipt of the 1004 Hz tone, measures the received tone level and makes whatever adjustment of the transmit pad at east station 20 is necessary. It then reverses the procedure from east to west and adjusts, as necessary, the attenuation of transmit pad of east station 10.

LOOPBACK TESTING

Testing of signal path continuity and transmission level validation via respective DS0 and DS1 loopback paths through the interface is effected by the use of respectively different tone sequences. The procedure carried out by the service test center depends upon whether the analog channel of the end office accessed by the test center is a four-wire or a two-wire circuit. In the case of a four-wire circuit, its full duplex capability permits transmission and monitoring of a test tone to be conducted simultaneously.

DS0 LOOPBACK TESTING

For testing the DS0 loopback path through tandem channel unit 41 from a four-wire circuit at west end station 10, the service test center applies, to its analog channel port 12, a first three tone sequence of 634 Hz, 484 Hz and 564 Hz, each tone persisting for a minimum duration of five seconds. The micro-controller within channel unit 41 is programmed to respond to this tone sequence by executing a DS0 loopback (via interface 90, FIG. 2) and synthesizing out a 1016 Hz, 0.0 dBm test tone over T1 link 14 to west station 10 for as long as the third tone in the sequence (564 Hz) is present. The service test center then conducts tone verification and tone level measurements with respect to the returned 1016 Hz tone.

In particular, the service test center measures the level of the returned 1016 Hz tone as a continuity and attenuation test Based upon this measurement, the service test center adjusts the attenuation of the receive communication path at station 10. It then terminates the transmission of the third tone in the sequence (564 Hz) and transmits a second test tone (1004 Hz, 0.0 dBm) in order to test the attenuation of the communication path through which signals are transmitted from the west station. A prescribed period of time after the 564 Hz tone is terminated (e.g. 45 seconds), tandem channel unit 41 returns via the DS0 loopback path through tandem channel unit 41. The service test center monitors the level of the received tone, and adjusts, as necessary, the attenuation of a transmission pad of west station 10. With both the receive and transmit attenuation pads of west station 10 now adjusted, the service test center may conduct a frequency sweep and level check of the loop, if desired. To terminate the DS0 loopback path, the service test center retransmits only the 634 Hz tone, to which the tandem channel unit responds by renormalizing loopback interface 90. As an auxiliary automatic loopback release, a prescribed time out (e.g. twenty minutes) may be employed.

DS1 LOOPBACK TESTING

In order to conduct continuity checks and transmission level validation through the DS1 loopback path via the DS1 loopback interface 100 (FIG. 2) coupled to the T1 port of tandem channel unit 42 of interface 30, a second tone loopback sequence, different from the above referenced tone sequence for a DS0 loopback, is employed. The second tone sequence includes the tones of the first tone sequence plus an additional tone pair, indicating that a DS1 loopback test is to be conducted with respect to tandem channel unit 42 of the tandem channel unit pair 30. The additional tone pair includes the second tone of the first sequence (i.e. 484 Hz) plus an additional tone (434 Hz) not used in the first sequence. This additional pair of tones is inserted immediately prior to the end tone of the sequence, so that the second tone sequence consists of the tones 634 Hz, 484 Hz, 434 Hz, 484 Hz and 564 Hz. It is to be observed that the arrangement of the tones of the five tone sequence is such that if one were to conduct a physical frequency sweep, dialing the frequency down from 634 Hz to 484 Hz and then 434 Hz to 484 Hz to 564 Hz, the sweep does not pass through any valid tone that the equipment is looking for, so that there is no chance of accidentally using a tone that would start another sequence and enter a potentially erroneous mode of operation.

To initiate DS1 loopback testing of tandem channel unit 42, the second tone sequence is applied from the service test center to the analog channel port 12 of west station 10, which digitizes the tones and transmits the digitized five tone sequence over T1 link 14 to intermediate station 30. Micro-controller 80 in tandem channel unit 42 responds to the five tone sequence in an incoming DS0 data stream by providing a DS1 loopback path through DS1 interface 100 (FIG. 2) and returns a DS1 loopback test tone of 2016 Hz, 0.0 dBm to west station 10 for as long as the 564 Hz tone is present. The returned 2016 Hz tone verifies the transmission path through the DS1 loopback interface.

The service test center may conduct a frequency sweep and level check of the loop, if desired. To terminate the DS1 loopback path, the service test center retransmits only the 634 Hz tone, to which tandem channel unit 42 responds by renormalizing loopback interface 100. Again, as an auxiliary automatic loopback release, a prescribed time out (e.g. twenty minutes) may be employed.

Figure 7:
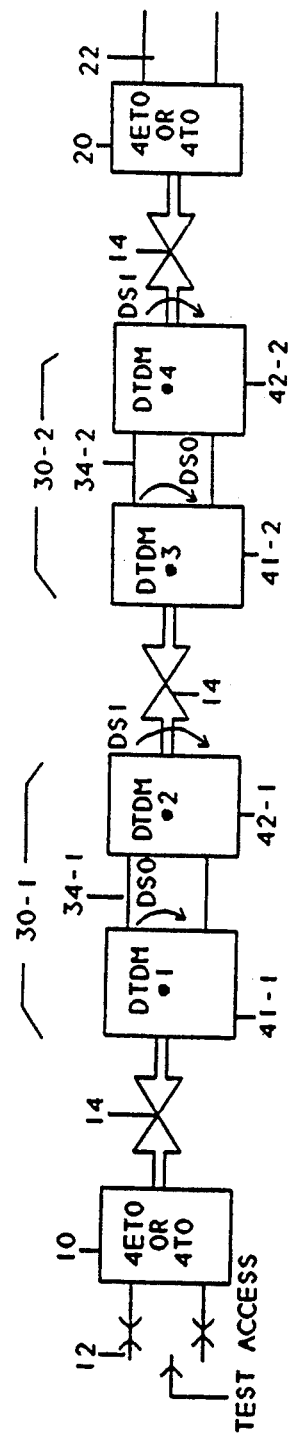
FIG. 7 shows a network containing a plurality of digital channel unit pairs connected in cascade in the T1 link.

TESTING OF CASCADED TANDEM CHANNEL UNIT PAIRS (FIG. 7)

Where the network contains a plurality of intermediate offices coupled in cascade within the T1 digital communication link between respective end stations, such as tandem channel unit pairs 41-1, 42-1 of intermediate office 30-1 and tandem channel unit pairs 41-2, 42-2 of cascaded intermediate office 30-2, testing of a selected tandem channel unit of a selected intermediate office is carried out by incorporating additional pairs of tones into the first tone sequence, the number of additional pairs identifying at which tandem channel unit in the chain of tandem channel unit pairs of the cascaded intermediate offices the loopback test is to be conducted. As long as the tandem channel unit to be tested is the near end tandem channel unit, relative to the incoming tone signal from the T1 link, namely a DS0 loopback test through one of near end tandem channel units 41-1 or 41-2 of the cascaded network of FIG. 7, both tone loopback verification and attenuation tests are conducted via the tandem channel unit's return of the 1016 Hz tone and the use of the 1004 Hz tone for transmit attenuation measurements via a DS0 loopback path, as described above. However, where the tandem channel unit to be tested is the far end tandem channel unit, relative to the incoming tone signal from the T1 link, namely one of tandem channel units 42-1, 42-2, only DS1 loopback verification via the return of the 2016 Hz tone is carried out.

FIG. 8 contains a Table A which sets forth the relationship between tandem channel unit position along the link relative to the end station from which the service test center conducts loopback testing and the particular tone sequence to be employed for that channel unit position.

TRANSMISSION TESTING FROM TWO-WIRE ANALOG CIRCUITS (FIG. 9)

As noted earlier, the test procedure carried out by the service test center depends upon whether the analog channel of the end office accessed by the test center is a four-wire or a two-wire circuit. In the case of a two-wire circuit, the foregoing test methodology is modified to accommodate its half-duplex capability, which does not permit simultaneous transmission and monitoring of a test tone.

Figure 9:
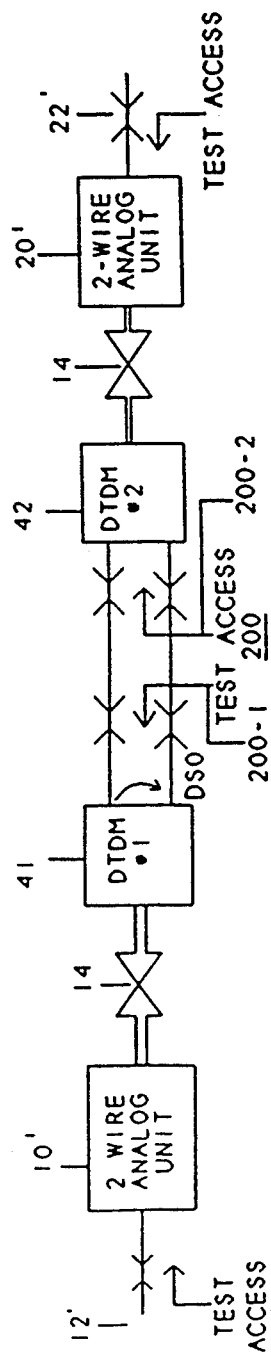
FIG. 9 diagrammatically shows a simplified network in which loopback testing of a tandem channel unit within a respective intermediate station is conducted from a two-wire analog channel port of an end station.

To conduct loopback testing of a tandem channel unit within a respective intermediate station from a two-wire analog channel port of west end station 10' of the simplified network diagrammatically shown in FIG. 9, the service test center first interrupts the cross-connect, intra-station digital communications link 34 between tandem channel units 41, 42 of intermediate central office 30 at access point 200-1 and then applies the above-described first tone sequence (634 Hz, 484 Hz and 564 Hz) to the two-wire analog channel port 12' of west end station 10'. This three tone sequence is digitized and transmitted over T1 link 14 to near end tandem channel unit 41.

As in the case of conducting the test through a four-wire circuit, the micro-controller of tandem channel unit 41 responds to this three tone sequence by executing a DS0 loopback through DS0 loopback interface 90 and returns a first tone (1016 Hz) over T1 link 14 to west station 10'. The service test center then switches its SARTS/SMAS connection at the two-wire analog channel port 12' of west station 10', in order that it may verify and monitor the level of the 1016 $H_z$ tone returned by tandem channel unit 41, the service test center adjusting the attenuation of the signal path through which the 1016 Hz tone is received at west station 10', as described above in the case of a four-wire circuit. If necessary, the service test center retransmits the 564 Hz tone to restart the 1016 Hz synthesized return from the tandem channel unit. In a two-wire circuit, the returned test tone will last for 45 sec. After it ceases, the 564 Hz tone will restart the 1016 Hz tone.

After conducting this first DS0 loopback test through near end tandem channel unit 41, the service test center terminates the near end loopback path by retransmitting the 634 Hz tone or by way of an automatic timeout termination. It then splits the intra-office path 34 at test point 200-2 and applies the first tone sequence to a two-wire analog channel port 22' of east end station 20', which digitizes the three tone sequence and transmits the digitized tone sequence over T1 link 14 to tandem channel unit 42. In response to this DS0 loopback-initiating three tone sequence, the micro-controller of tandem channel unit 42 executes a DS0 loopback through its DS0 interface 90 toward east end station 20' and returns a synthesized 1016 Hz tone over T1 link 14 to east end station 20'.

The service test center then switches its SARTS/SMAS connection at two-wire analog channel port 22' of east end station 20' in order that it may verify and monitor the level of the 1016 Hz tone returned by tandem channel unit 42, the service test center adjusting the attenuation of the signal path through which the 1016 Hz test tone first is received at east end station 20'. Once the DS0 loopback test through tandem channel unit 42 is completed, the service test center terminates the DS0 loopback path by retransmitting the 634 Hz tone (or by way of an automatic timeout (e.g. 20 minutes) termination).

With the attenuation in the signal paths through which the test tones are received via the analog channel ports of the two end stations of the network adjusted, the service test center reestablishes the cross-connect link 34 of the intermediate central office and applies a 1004 Hz, 0.0 dBm test tone to two-wire analog channel port 12' of west end station 10'. This 1004 Hz tone is digitized and transmitted over a digital communications path containing the T1 link 14 from the west station 10 to the intermediate central office 30, the reconnected cross-connect path 34 through intermediate central office 30, and the T1 link 14 to the east end station 20'. Via analog channel port 22' of east station 20', the service test center conducts tone verification and tone level measurements with respect to the 1004 Hz test tone. Then, based upon the measurements at east station 20', the service test center adjusts the attenuation characteristic of the signal transmission path through which the 1004 Hz test tone is transmitted from west station 10'.

After making these transmission attenuation adjustments, the service test center carries out a reciprocal transmission test via analog channel port 22' of east end station 20'. Specifically, the service test center applies 1004 Hz test tone to two-wire analog channel port 22' of east station 20', which digitizes the test tone and transmits the digitized 1004 Hz tone over a digital communications path containing T1 link 14 from east station 20' to intermediate central office 30, the reconnected cross-connect path 34 between tandem channel units 41-42, and the T1 link 14 to the west station 10'. Via analog channel port 12' of west station 10', the service test center conducts tone verification and tone level measurements with respect to the 1004 Hz test tone sourced from east station 20'. Then, based upon the measurements at west station 10', the service test center adjusts the attenuation characteristic of the signal transmission path through which the 1004 Hz test tone is transmitted from east station 20'.

Figures 10, 12:
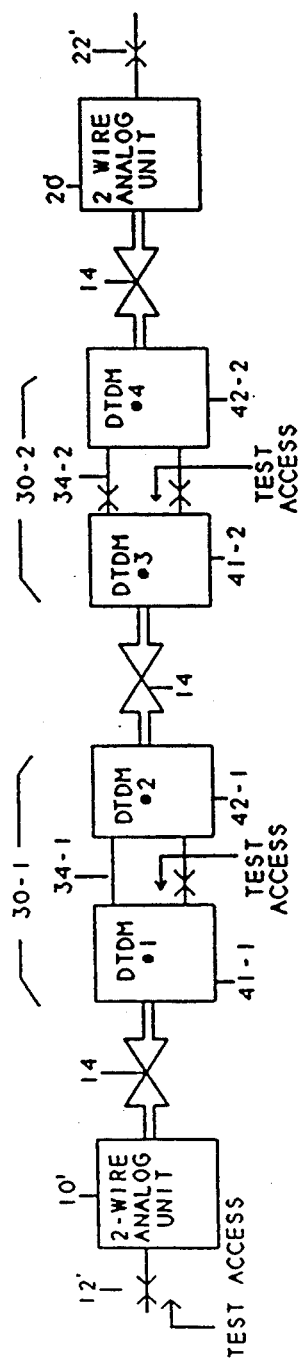
FIG. 10 diagrammatically illustrates a telephone network containing a plurality of tandem channel unit pairs coupled in cascade within the T1 digital communication link between respective end stations that employ two-wire analog circuits.
FIG. 12 contains a table of tones capable of being returned by the micro-controller of a tandem channel unit for a telephone equipment operation specified by the contents of the A/B bits of a DS1 data stream from an end station.

TESTING OF CASCADED TANDEM CHANNEL UNIT PAIRS (FIG. 10)

Where the network contains a plurality of tandem channel unit pairs coupled in cascade within the T1 digital communication link between respective end stations that employ two-wire analog circuits, as illustrated in the cascaded central office network diagram of FIG. 10, initiating a loopback for a selected tandem channel unit is effected in the same manner as in the case of accessing a tandem channel unit via a four-wire circuit. Namely, the tandem channel unit of interest is selected by incorporating additional pairs of tones into the first tone sequence, the number of additional pairs identifying at which tandem unit in the chain of tandem channel unit pairs of the cascaded intermediate offices the loopback test is to be conducted. The methodology described above for one of the tandem channel units of a tandem channel unit pair is carried out for the selected tandem channel unit, the service test center interrupting the cross-connect 34 of the tandem channel unit pair and conducting tone testing from an end station. Both tone verification and attenuation tests are conducted via the tandem unit's DS0 loopback return of a test tone, in the manner described above for a transmission test from a two-wire circuit.

Thus, for conducting a DS0 loopback test of tandem channel unit 41-1 of central office 30-1 from a two-wire circuit port 12' of west end office 10', the service test center initially interrupts the cross-connect link 34 between tandem channel unit 41-1 and tandem channel unit 42-1. It then applies a prescribed tone sequence to the two-wire analog channel port 12' of the accessing west end station 10', the prescribed tone sequence being uniquely associated with the tandem unit to be tested in accordance with the tandem unit identification sequences of Table A in FIG. 8, referenced above.

In response to this tone sequence, the resident microcontroller of the selected tandem channel unit 41-1 executes a DS0 loopback and returns a synthesized 1016 Hz test tone to west station 10. The service test center switches its SARTS/SMAS connection to the two-wire analog channel port 12' of the west end station and conducts tone verification and tone level adjustment with respect to the 1016 Hz test tone.

For conducting a DS1 loopback test of tandem channel unit 42-1 of central office 30-1 from a two-wire circuit port 12' of west end office 10', cross-connect link 34-1 is reconnected and the service test center applies a different tone sequence to the two-wire analog channel port 12' of the accessing west end station 10', the tone sequence again being uniquely associated with the tandem unit to be tested in accordance with the tandem unit identification sequences of Table A in FIG. 8, referenced above.

In response to this tone sequence, the resident microcontroller of the selected tandem channel unit 42-1 executes a DS1 loopback and returns a synthesized 2016 Hz test tone to west station 10'. The service test center switches its SARTS/SMAS connection to the two-wire analog channel port 12' of the west end station and conducts tone verification with respect to the 2016 Hz test tone. (For testing a tandem channel unit, via either a DS0 loopback path or a DS1 loopback path, to the east station end of T1 link, the service test center carries out the above procedure in an east to west direction.)

With the attenuation in the signal paths through which the test tones are received via the two-wire analog channel ports of the two end stations of the network adjusted, the service test center reestablishes the cross-connect link 34 of the selected tandem channel unit pair and conducts transmit attenuation adjustments in the same manner described above for non-cascaded two-wire circuit.

SIGNALLING PATH TESTING (FIG. 11)

In addition to furnishing the capability to test the continuity and attenuation characteristics of the voice/data transmission path through one or more tandem channel unit pairs, the present invention also provides for the testing the ability of the signalling path through which the operation control signals (A/B bits) are conveyed. For this purpose, the buffer control software within a respective tandem unit's micro-controller is such that the signalling state specified by the last received A/B bits is stored. Storing this information permits signalling conditions, such as tip-to-ground, to be established before interrupting the cross-connect by way of a test access point.

Figure 11:
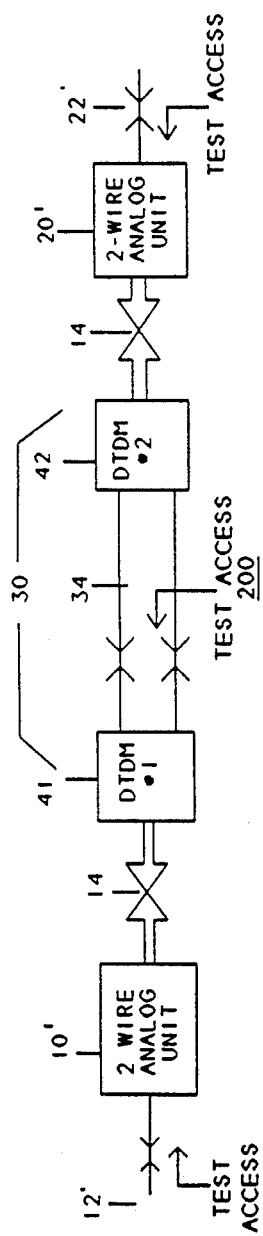
FIG. 11 diagrammatically illustrates a network in which signalling testing is effected by a service test center accessing the network from analog channel port of an end station.

Referring to FIG. 11, to conduct a signalling test, the service test center accesses the network from analog channel port 12' of west end station 10' and applies a prescribed telephone equipment operation control signal, so as to place a stable signalling condition (e.g. idle, ground-on-ring, loop closure, reverse battery) on the analog channel port. Prior to setting up a stable signalling condition, first, if necessary, predecessor condition, such as tip-ground, is set upon at port 22' into the analog channel unit at east station 20'. Secondly, a stable signalling condition, such as loop closure, is set up at port 12' of east station 10'. Loop closure, in order to be activated, may require a tip-ground from the far end before it can be engaged. The west end station encodes the prescribed control signal into the A/B bits positions of transmitted digital data frames and transmits the data over digital communications link 14 to the intermediate station 30.

The service test center then interrupts the cross-connect path 34 of the accessed office so as tit break the connection at point 200 between tandem channel unit 41 and tandem channel unit 42, and applies simplex voltages on the T1/R1 and T/R leads of the intra-office four wire pair 34. Specifically, the battery simplex voltage is applied on the T/R leads and ground is applied on the T1/R1 of the intra-office pair simplex voltage that is connected to unit 41. The micro-controller of tandem channel unit 41 responds by returning one of the tones tabulated in FIG. 12 (at 0.0 dBm), for a telephone equipment operation as specified by the contents of the A/B bits at the time of the simplex voltage application on the intra-office four wire pair. The service test center monitors the analog channel port 12 of west end station 10 for the return of the tone signal from tandem channel unit 41 and verifies that the returned tone is correct for the signalling condition specified in the transmitted A/B bits. The service test center repeats the above procedure as necessary to test other signalling conditions for the near end tandem channel unit 10'. To test tandem channel unit 42, the service test center carries out the above procedure from the east station 20'.

The communication protocol employed by the micro-controller of a tandem channel unit verifies the signalling path across the intra-office path 34 through both tandem channel units if two conditions are satisfied: first—the signalling path to the near end tandem unit (relative to the end station accessed by the service test center) is valid; and secondly, tone loopback is successful from the associated far end tandem unit. Once the signalling path has been tested with respect to the near end tandem channel unit of the interface, then, if the end station-to-end station link has been tested to be valid, the signalling path is known to be valid through the interface.

As will be appreciated from the foregoing description, the digital tandem channel unit of the present invention, by maintaining the digital format of the T1 traffic in the course of the DS0 tandem cross-connect eliminates the possibility of corruption of voice/data traffic, as may occur in a conventional 'analog' office cross-connect tandem pair due to quantization errors introduced into the data stream in the course of the digital to analog conversion of the data. In addition, by means of a prescribed DS0 frame synchronization mechanism, it obviates the need for an additional pair of wires to provide for control signalling. Finally, the invention incorporates control software in each tandem channel unit's micro-controller that allows it to respond to analog tone signalling test procedures initiated from either two or four-wire channel ports of network access equipment.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a telephone communication network containing a digital communication link over which digitized communication signals, including information signals and telephone equipment operation control signals that have been encoded into digital format, are conveyed between stations of said network, and wherein said network includes one or more intermediate stations coupled in said digital communication link, a respective intermediate station having first and second digital communication ports to which respective portions of said digital communication link are coupled, and an intra-station, cross-connect communication path through which incoming digital communication signals received at said first and second ports are interfaced to said second and first ports, respectively, and transmitted therefrom as outgoing digital communication signals, a method of effecting a digital cross-connect of received digital communication signals between said first and second ports comprising the steps of:

(a) providing an intra-station digital communications path between said first and second ports of said intermediate station;

(b) at one of said first and second ports, receiving incoming digital communication signals from said digital communications link, providing a pattern of digitally encoded synchronization signals and replacing selected incoming digital communication signals with signals of said pattern of digitally encoded synchronization signals to provide a digitally modified version of said incoming digital communication signals, and transmitting said digitally modified version of said incoming digital communication signals over said intra-station digital communications path to the other of said first and second ports; and (c) at the other of said first and second ports, receiving said digitally modified version of said incoming digital communication signals that has been transmitted over said intra-station digital communications path in step (b), and transmitting outgoing digital communication signals containing said information and equipment operation control signals as received at one port in dependence upon said pattern of digitally encoded synchronization signals contained in said digitally modified version of said incoming digital communication signals.

2. A method according to claim 1, wherein said digital communication signals comprise successive frames of digital signals, each frame containing a prescribed number of bytes of digital signals, and wherein step (b) comprises (b1) generating a digital framing pattern comprised of a prescribed sequence of digital signal values, (b2) substituting respective ones of the digital signal values within said framing pattern for digital signal values of a preselected location within respectively successive frames of said digital communication signals, so as to obtain said digitally modified version of said incoming digital communication signals, containing successive frames of digital communications signals, each resulting digitally modified frame containing a respectively successive one of the data values of said framing pattern, and (b3) transmitting said digitally modified version of said incoming digital communication signals.

3. A method according to claim 2, wherein said digital framing pattern generated in step (b1) is comprised of a sequence of digital signal values 1110010.

4. A method according to claim 1, wherein said digital communication signals comprise successive frames of digital data, each frame containing a prescribed number of bytes of digital data, and wherein step (b) comprises (b1) generating successive frames of digital data, each frame containing a prescribed number of bytes of digital data, respective bytes of a frame containing bytes of data that are containing within an incoming frame of data received at said one port, (b2) generating a frame synchronization pattern containing a prescribed bit sequence, (b3) at one of the bits of a first prescribed byte within each successive frame generated in step (b1), substituting a successive one of the bits of the frame synchronization pattern generated in step (b2), (b4) at one of the bits of one or more preselected bytes within each successive frame generated in step (a), including a respective one of one or more telephone equipment operation control bits derived from a respective successive one of the frames of digital data received from said digital communications link at said one port, and (b5) transmitting successive frames of digital data, containing bits substituted in accordance with steps (b3) and (b4), over said intra-station digital communications path to the other of said first and second ports.

5. A method according to claim 4, wherein step (c) comprises (c1) receiving, from said intra-station digital communications path, successive frames of digital data transmitted in step (b5), and extracting therefrom one or more telephone equipment operation control bits substituted in step (b4) by detecting said frame synchronization pattern in the received successive frames of digital data, (c2) generating successive outgoing frames of digital data for transmission via said other port to said digital communications link, each outgoing frame containing said prescribed number of bytes of digital data, and wherein one or more of the bytes of a respective outgoing frame contains a respective one or more of the control bits extracted in step (c1), said one or more of the bytes of a respective outgoing frame respectively corresponding to the one or more bytes of a respective frame of digital data received via said one port from said digital communications link, and (c3) transmitting the successive outgoing frames of digital data, generated in step (c2), via said other port over said digital communications link.

6. A method according to claim 5, wherein step (c1) comprises monitoring, as necessary, successively different bytes of respectively successive pluralities of frames of data transmitted in step (b5) to identify in which byte of the frames of data transmitted in step (b5) said frame synchronization pattern has been injected, and identifying which byte in a frame of data is associated with said frame synchronization pattern in response to detecting said frame synchronization pattern in a prescribed number of successive frames.

7. A method according to claim 5, wherein step (c2) includes replacing each of the bits of the frame synchronization pattern with a prescribed logical bit value in the course of generating said successive frames of outgoing digital data.

8. A method according to claim 5, further including the step of
(d) generating a loss-of-synchronization signal in response to detecting, in step (c1), the presence of a single bit error in a predetermined plurality of detected frame synchronization pattern bytes.

9. A method according to claim 5, further including the step of
(d) generating a loss-of-synchronization signal in response to detecting, in step (c1), the presence of more than a single bit error in the detected frame synchronization pattern.

10. For use with a telephone communication network containing a digital communication link over which digitized communication signals, including information signals and telephone equipment operation control signals that have been encoded into digital format, are conveyed between stations of said network, and wherein said network includes one or more intermediate stations coupled in said digital communication link, a respective intermediate station having first and second digital communication ports to which respective portions of said digital communication link are coupled, and an intra-station, cross-connect communication path through which incoming digital communication signals received at said first and second ports are interfaced to said second and first ports, respectively, and transmitted therefrom as outgoing digital communication signals, a digital tandem channel unit which provides a digital cross-connect of received digital communication signals between said first and second ports comprising:
an interstation-to-intra-station digital signal interface unit, which is coupled to one of said first and second ports and receives incoming digital communication signals from said digital communications link to which said one of said first and second ports is coupled, provides a pattern of digitally encoded synchronization signals, replaces selected incoming digital communication signals with signals of said pattern of digitally encoded synchronization signals to provide a digitally modified version of said incoming digital communication signals, and transmits the digitally modified version of the incoming digital communication signals over an intra-station digital communications path employed as said intra-station, cross-connect communication path; and
an intra-station-to-interstation digital signal interface unit, which is coupled to said intra-station digital communications path, and receives a digitally modified version of digital communication signals that has been transmitted over said intra-station digital communications path from an interstation-to-intra-station digital signal interface unit to which the other of said ports is coupled, and transmits outgoing digital communication signals containing said information and telephone equipment operation control signals as received at said other port in dependence upon the pattern of digitally encoded synchronization signals contained in the digitally modified version of incoming digital communication signals received at the other port.

11. A digital tandem channel unit according to claim 10, wherein said digital communication signals comprise successive frames of digital signals, each frame containing a prescribed number of bytes of digital signals, and wherein said interstation-to-intra-station digital signal interface unit is operative to generate a digital framing pattern comprised of a prescribed sequence of digital signal values, substitute respective ones of the digital signal values within the framing pattern for digital signal values of a preselected location within respectively successive frames of said digital communication signals, so as to obtain a digitally modified version of said incoming digital communication signals, containing successive frames of digital communications signals, each resulting digitally modified frame containing a respectively successive one of the data values of said framing pattern, and transmit the digitally modified version of the incoming digital communication signals over said intra-station communications link.

12. A digital tandem channel unit according to claim 10, wherein said digital communication signals comprise successive frames of digital data, each frame containing a prescribed number of bytes of digital data, and wherein said interstation-to-intra-station digital signal interface unit is operative to perform the following sequence of steps
i—generating successive frames of digital data, each frame containing a prescribed number of bytes of digital data, respective bytes of a frame containing bytes of data that are containing within an incoming frame of data received at said one port,
ii—generating a frame synchronization pattern containing a prescribed bit sequence,
iii—substituting, for one of the bits of a first prescribed byte within each successive frame, a successive one of the bits of the frame synchronization pattern,
iv—including, as one of the bits of one or more preselected bytes within each successive frame, a respective one of one or more telephone equipment operation control bits derived from a respective successive one of the frames of digital data received from the digital communications link at said one port, and
v—transmitting successive frames of digital data, containing substituted and included bits over the intra-station digital communications path.

13. A digital tandem channel unit according to claim 12, wherein said intrastation-ti-interstation digital signal interface unit is operative to perform the following steps
vi—receiving, from the intra-station digital communications pat h, successive frames of digital data transmitted from an interstation-to-intra-station digital signal interface to which said second port is coupled, and vii—extracting one or more telephone equipment operation control bits by detecting the frame synchronization pattern in the received successive frames of digital data, viii—generating successive outgoing frames of digital data for transmission via said first port to said digital communications link, each outgoing frame containing said prescribed number of bytes of digital data, and wherein one or more of the bytes of a respective outgoing frame contains a respective one or more of the extracted control bits, the one or more of the bytes of a respective outgoing frame respectively corresponding to the one or more bytes of a respective frame of digital data received via said second port from said digital communications link, and ix—transmitting the successive outgoing frames of digital data via said first port over said digital communications link.

14. A digital tandem channel unit according to claim 13, wherein said intra-station-to-interstation digital signal interface is operative to monitor, as necessary, successively different bytes of respectively successive pluralities of frames of data transmitted over said intra-station, cross-connect communications link, so as to identify in which byte of the frames of data said synchronization pattern has been injected.

15. A digital tandem channel unit according to claim 14 wherein said intra-station-to-interstation digital signal interface is operative to identify which byte in a frame of data is associated with said synchronization pattern in response to detecting said frame synchronization pattern in a prescribed number of successive frames.

16. A digital tandem channel unit according to claim 13, wherein step viii includes replacing each of the bits of the frame synchronization pattern with a prescribed logical bit value in the course of generating successive frames of outgoing digital data.

17. A digital tandem channel unit according to claim 13, wherein said intra-station-to-interstation digital signal interface is operative to generate a loss-of-synchronization signal in response to detecting the presence of a single bit error a predetermined plurality of successive ones of the detected frame synchronization pattern byte.

18. A digital tandem channel unit according to claim 13, wherein said intra-station-to-interstation digital signal interface is operative to generate a loss-of-synchronization signal in response to detecting the presence of more than a single bit error in a prescribed plurality of successive ones of the detected frame synchronization pattern byte.

19. A digital tandem channel unit according to claim 12, wherein the frame synchronization pattern generated in step ii is comprised of a sequence of digital signal values 1110010.

* * * * *